(12) United States Patent
Harding et al.

(10) Patent No.: US 6,651,188 B2
(45) Date of Patent: Nov. 18, 2003

(54) AUTOMATIC REPLACEMENT OF CORRUPTED BIOS IMAGE

(75) Inventors: Matthew C. Harding, San Luis Obispo, CA (US); Peter A. Hawkins, San Luis Obispo, CA (US)

(73) Assignee: Intel Corporation, Santa Clara, CA (US)

(*) Notice: Subject to any disclaimer, the term of this patent is extended or adjusted under 35 U.S.C. 154(b) by 239 days.

(21) Appl. No.: 09/895,981

(22) Filed: Jun. 29, 2001

(65) Prior Publication Data

US 2003/0005277 A1 Jan. 2, 2003

(51) Int. Cl.[7] ................................................. G06F 11/00
(52) U.S. Cl. .......................................................... 714/38
(58) Field of Search ............................... 714/38, 39, 42, 714/25, 26, 6, 7, 13, 43, 47, 45, 35; 711/133, 134

(56) References Cited

U.S. PATENT DOCUMENTS

| | | | | |
|---|---|---|---|---|
| 5,214,695 A | * | 5/1993 | Arnold et al. ................ | 713/2 |
| 5,475,839 A | * | 12/1995 | Watson et al. ................ | 713/2 |
| 5,793,943 A | * | 8/1998 | Noll ............................. | 714/6 |
| 5,797,023 A | * | 8/1998 | Berman et al. ............. | 713/324 |
| 5,918,047 A | * | 6/1999 | Leavitt et al. ................ | 713/2 |
| 6,185,696 B1 | * | 2/2001 | Noll ............................. | 714/6 |
| 6,233,681 B1 | | 5/2001 | Kang | |

FOREIGN PATENT DOCUMENTS

EP          0 936 548 A1    1/1999

* cited by examiner

Primary Examiner—Nadeem Iqbal
(74) Attorney, Agent, or Firm—Blakely, Sokoloff, Taylor & Zafman LLP

(57) ABSTRACT

A primary BIOS may be used to boot a system after the primary BIOS has been validated. If the primary BIOS fails the validation test, a backup BIOS may automatically be used to boot the system. If the primary BIOS passes the validation test, but fails to complete execution in a predetermined period of time, the backup BIOS may automatically be used to boot the system. Code for validating the primary BIOS may be contained in the backup BIOS. The primary BIOS may be revised during system operation, but the backup BIOS may be write-protected during system operation to prevent the backup BIOS from being corrupted. A plug-in module may be used to revise the backup BIOS by booting from the plug-in module rather than the primary or secondary BIOS, and copying a BIOS program from the plug-in module to the backup BIOS.

17 Claims, 6 Drawing Sheets

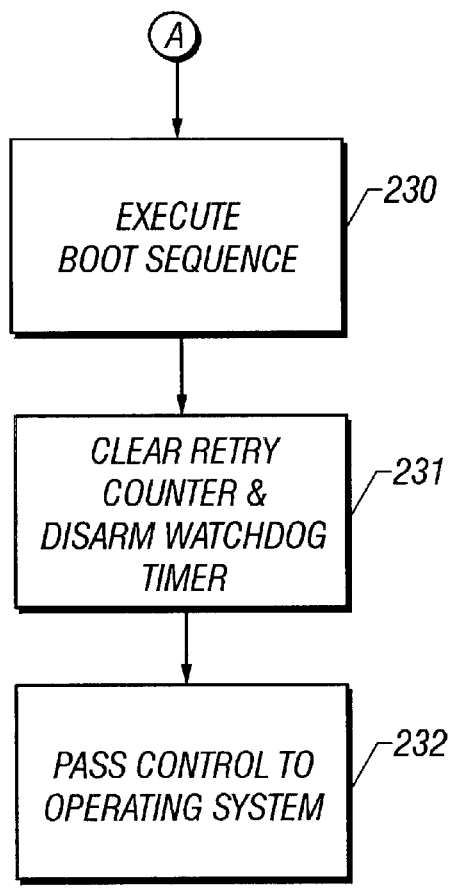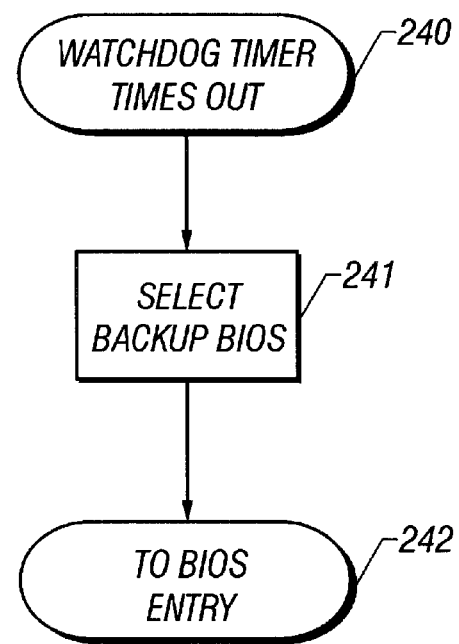
*FIG. 2B*  *FIG. 2C*

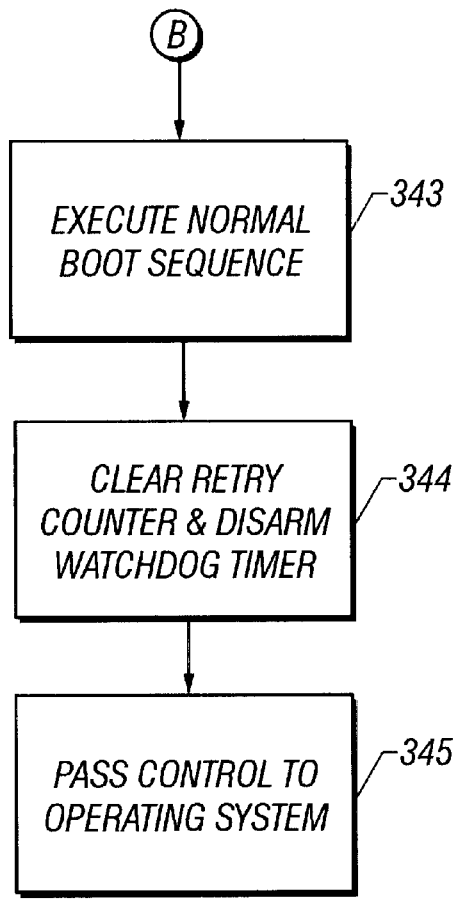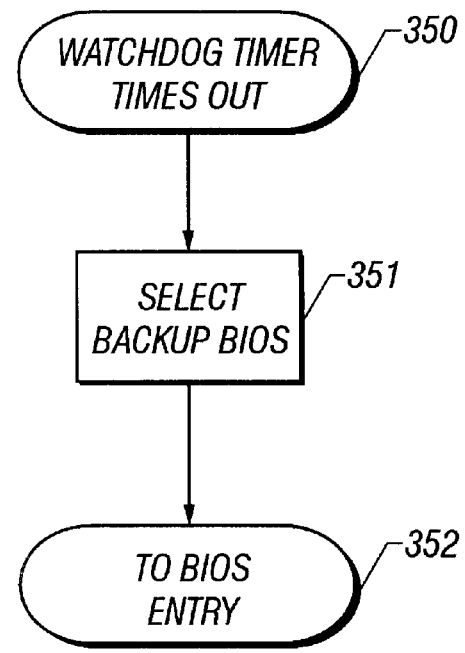
FIG. 3B
FIG. 3C

AUTOMATIC REPLACEMENT OF CORRUPTED BIOS IMAGE

BACKGROUND OF THE INVENTION

1. Field of the Invention

The invention pertains generally to computers. In particular, it pertains to management of the BIOS image in computers.

2. Description of the Related Art

Computers are usually initialized by executing a Basic Input/Output System (BIOS). The BIOS is non-volatile code that determines what the computer can do without accessing programs from a disk. On personal computers (PCs), the BIOS contains all the code required to perform a self-test and to control the keyboard, display screen, disk drives, serial communications, and a number of miscellaneous functions. The BIOS then loads the operating system from disk. Originally, the BIOS was placed in a read-only memory (ROM) and could not be modified without physically replacing the ROM. As the functions performed by the BIOS became more complex, and computers became easier to reconfigure after manufacture, the BIOS was placed on rewritable programmable ROMs, such as flash memory.

Since the BIOS can now be rewritten in the field after the computer becomes operational, and a computer cannot be booted without a valid BIOS, this raises reliability and security issues. A computer can be disabled if the BIOS is corrupted by being rewritten incorrectly, such as by user error, power interruption, or software malfunction. To help prevent an unrecoverable condition, many systems contain a backup copy of the system BIOS that can be relied upon if the primary BIOS is faulty. However, these generally require physical intervention by the user to activate the backup BIOS. For example, the backup BIOS may be enabled by a mechanical switch or jumper on the motherboard. Those systems that have some sort of automatic recovery still require the physical presence and intervention of an operator—to choose boot options or to insert a recovery disk, for example. If the faulty BIOS was caused by a download to a remote system with no operator present, the corrective action (dispatching a technician to the site) can be very expensive in terms of both money and downtime. An additional disadvantage of the convention BIOS redundancy approach is that the two BIOS copies are usually stored in two separate memory devices, which increases manufacturing costs.

BRIEF DESCRIPTION OF THE DRAWINGS

FIGS. 2A, 2B, 2C show a flow chart of a method embodiment.

FIGS. 3A, 3B, 3C show a more detailed flow chart of a method embodiment.

DETAILED DESCRIPTION OF THE INVENTION

Various embodiments allow a backup BIOS image to automatically be enabled whenever the primary BIOS image is faulty, without any intervention by an operator. It may also allow both BIOS images to be stored in one physical device, decreasing board area and cost. In operation, execution may begin in the backup BIOS, which may validate the primary BIOS. If the primary BIOS passes the validation test, control may then be transferred to the primary BIOS to perform the boot sequence. If the primary BIOS fails the validation test, indicating it has been corrupted, the backup BIOS may generate a warning indicator and perform the boot sequence. If the primary BIOS passes the validation test but does not complete the boot sequence correctly, indicating it is faulty in a way that eluded the validation test, the backup BIOS may be used to boot the system. The boot sequence for the primary and backup BIOS images do not have to be identical.

Figure 1:
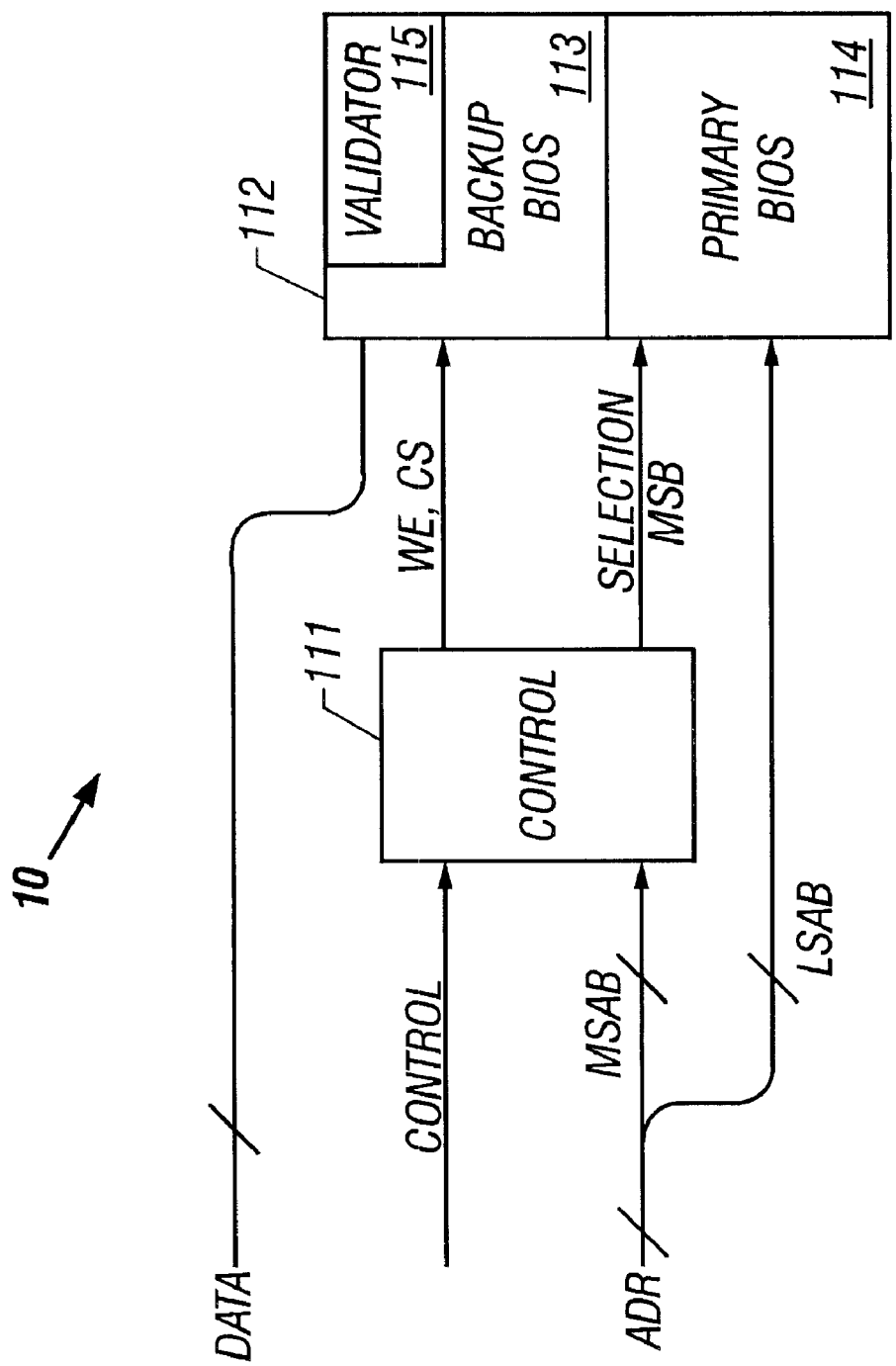
FIG. 1 shows a block diagram of a dual-BIOS system.

FIG. 1 shows functional components of an embodiment of a dual-BIOS system 10. Memory device 112 may be used to hold the code for both the backup BIOS 113 and the primary BIOS 114. In one embodiment, memory device 112 may be a programmable read-only memory (PROM) such as a flash memory device. In one embodiment, memory device 112 may be a single integrated circuit. Control logic 111 may be used to control the operation of memory device 112 to enable the features of the dual-BIOS system 10. In operation, the address lines ADR of a bus may be used to read the contents of the memory device 112 over data lines DATA to retrieve instructions for initializing the system. In one embodiment, address lines ADR include all 32 bits of a 32-bit address bus. To permit easy switching between backup BIOS 113 and primary BIOS 114, the least significant address bits (LSAB) may be routed directly to memory device 112, while the most significant address bits (MSAB) may be routed to control logic 111. Control logic 111 may then issue selected ones of the most significant bits (SELECTION MSB) to select either backup BIOS 113 or primary BIOS 114. The number of bits in LSAB may be designed to accommodate the maximum size of each BIOS. In one embodiment, LSAB consists of 16 address lines to permit directly addressing a BIOS address space of 64k. In a 32-bit address environment, this may leave 16 bits for MSAB. However, the number of bits in SELECTION MSB may be reduced to only those that will change state during BIOS operations, while the remaining high-order address bit inputs to memory device 112 may be ignored. The number of bits required for SELECTION MSB depends on the specific address ranges selected for backup BIOS 113 and primary BIOS 114. In one embodiment, SELECTION MSB includes only one bit, to permit switching between the two address ranges.

Control logic 111 may also have several control inputs from the bus. In one embodiment, these may include Write Enable, Chip Select to the BIOS device, and CPU-INIT. Control logic 111 may output multiple control signals to memory device 112. In one embodiment, these may include Write Enable (WE) and Chip Select (CS). However, these two signals being output from control logic 111 may not track the equivalent signals being input to control logic 111 because control logic 111 may manipulate them to control the automatic dual-BIOS function.

Backup BIOS 113 may be located in an address space of memory device 112 that will be decoded as read-only by control logic 111, while primary BIOS 114 may be located in an address space of memory device 112 that will be decoded as read/write by control logic 111. The read-only state may be enforced by write-protecting the backup BIOS. This may be accomplished by deasserting the Write Enable line to memory device 112 whenever any portion of backup BIOS 113 is being addressed, thus preventing the possibility of corrupting backup BIOS 113 with a write operation. In this embodiment, primary BIOS 114 may be revised by reprogramming it, but backup BIOS 113 may remain unchanged so that any detected problem with primary BIOS 114 may be avoided by booting the system with the older, proven, backup BIOS 113. Validator 115 may be used to validate primary BIOS 114 to determine if primary BIOS 114 has been corrupted; i.e., if portions of it did not program correctly. In one embodiment, validator 115 includes code located in backup BIOS 113 to perform a checksum process on primary BIOS 114. Control logic 111 may assert the Chip Select line to memory device 112 whenever memory device 112 is being addressed, regardless of which BIOS is being addressed.

Figure 2A:
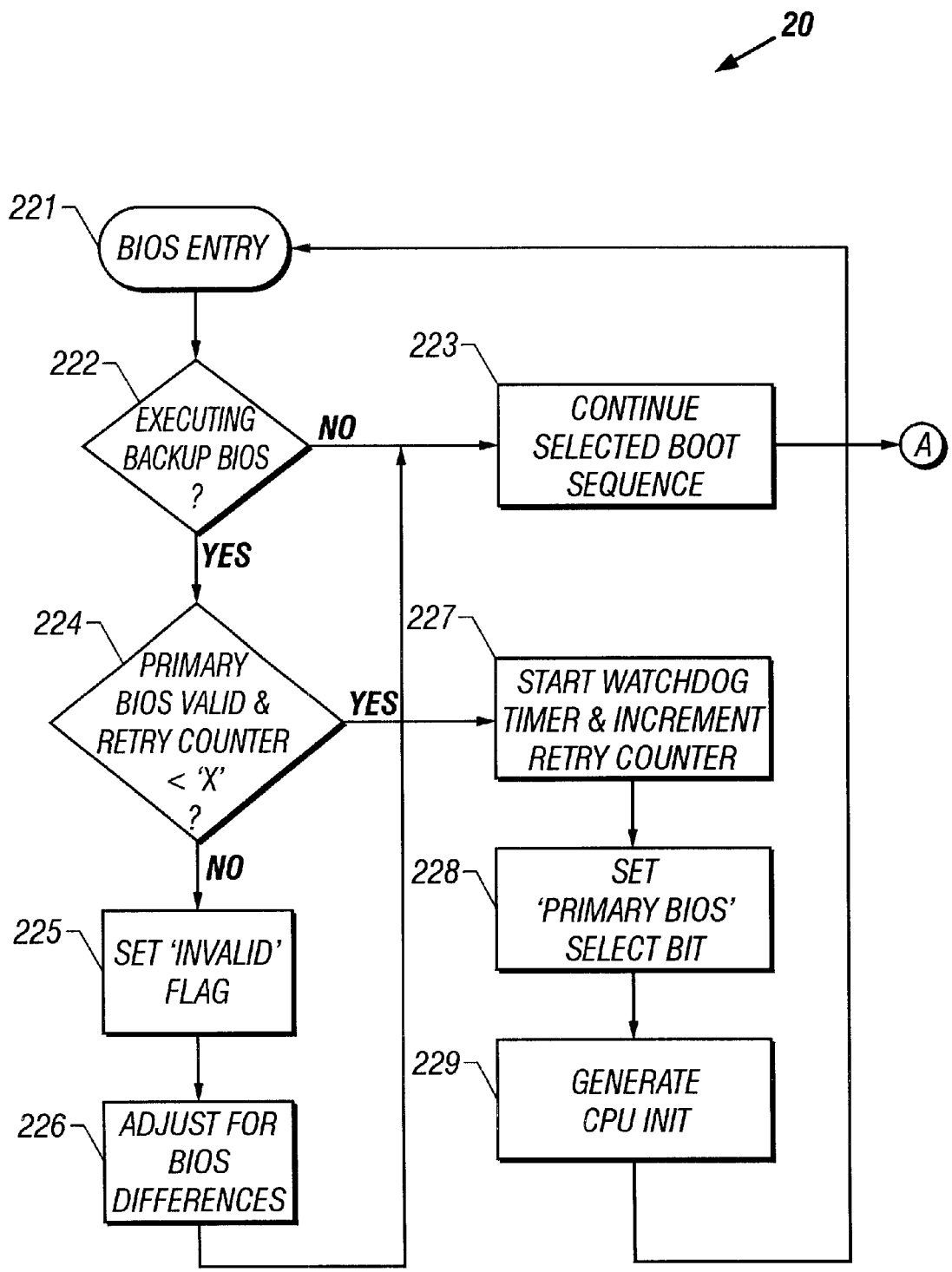

FIGS. 2A–C show a flow chart of a method embodiment 20. The BIOS entry point is shown at block 221. This point may be entered as the result of, for example, a system reset, a CPU initialization signal, or a jump to the boot vector. In one embodiment, the BIOS entry point is at the top of addressable memory space. Block 222 determines whether the backup BIOS or the primary BIOS is being executed. In one embodiment, this may be determined by examining a bit that is set to control which BIOS is to be executed. In another embodiment, this may be determined by examining one or more high-order address bits. If the backup BIOS is executing, the backup BIOS may validate the primary BIOS at block 224 to determine if the primary BIOS is corrupted, and may also check a retry counter that tracks the number of times the primary BIOS has unsuccessfully tried to execute. Corruption of the primary BIOS may be due to various causes, such as errors in writing the code into the portion of the memory device containing the primary BIOS code. Another cause may be failure of at least one memory cell in the portion of the memory device containing the primary BIOS code. In one embodiment, validation may be done by executing a checksum on the code of at least a portion of the primary BIOS. In another embodiment, the backup BIOS may perform a more extensive validation test on the primary BIOS. If the primary BIOS is found to be corrupted, or if the retry counter has reached a predetermined value designated here as 'X', the backup BIOS may set an error indicator, such as an 'Invalid' flag, at block 225 to indicate that the primary BIOS is unreliable and that the backup BIOS will be used to boot the system. Block 226 may be used to make adjustments for the fact that the primary and backup BIOS images may be different. If the primary BIOS has previously been revised, it may have changed other parameters that make it incompatible with the unchanged backup BIOS. For example, if the primary BIOS requires different CMOS settings than the backup BIOS, these settings may need to be modified at block 226 to be compatible with the backup BIOS. After making these adjustments, if they are necessary, the boot sequence can continue at block 223 in the backup BIOS and move to point 'A' that continues in FIG. 2B.

Returning to block 224, if the primary BIOS is found to be valid and the retry counter has not reached the predetermined value, a watchdog timer may be started at block 227 that may be used later to detect a fault in the BIOS that was not detected by the validation test. The retry counter that was tested in block 224 may also be incremented. A 'primary BIOS' indicator may be set at block 228 to switch control to the primary BIOS. In one embodiment, this may consist of setting a hardware bit. At block 229, a CPU initialization signal may be generated to force execution back to the BIOS entry point at block 221. In one embodiment, this initialization signal may be generated under control of the BIOS code. In another embodiment, it may be generated in hardware as a result of setting the select bit in block 228. After execution moves to the BIOS entry point, block 222 may once again determine whether the primary or backup BIOS is being executed. Since the 'primary BIOS' indicator was set at block 228, the primary BIOS is now executing and the boot sequence may continue at block 223. From there, execution may continue at point 'A' in FIG. 2B.

At block 230 of FIG. 2B, the selected boot sequence executes. If the boot sequence executes properly, it will complete before the watchdog timer times out, and it will clear the retry counter and disarm the watchdog timer at block 231 before passing control to the operating system at block 232. If the boot sequence is expected to take longer than the longest period the watchdog timer can be set to, the boot sequence may be programmed to periodically restart the watchdog timer. Otherwise, the watchdog timer may be set to a single value that allows time for the boot sequence to run to completion. FIG. 2C shows the sequence that occurs if the watchdog timer times out as indicated at block 240. A timeout of the watchdog timer may indicate that execution of the BIOS is not going as planned and that something is wrong with that execution. This may be used to detect some faults in the BIOS that escaped detection in the validation test. A timeout may reselect the backup BIOS at block 241 and return control to the BIOS entry point from block 241 in FIG. 2C to block 221 in FIG. 2A. This may restart the validation and timeout sequences previously described. If the watchdog timer times out, indicating an execution failure of the primary BIOS, the primary BIOS may be retried a predetermined number of times by use of the retry counter which is tested at block 224 and incremented at block 227. When the designated number of retries occurs, the retry counter will reach a value of 'X', which causes execution of the backup BIOS in blocks 225–226, 223, and 230–232. The retry counter may be initialized (not shown) before the first boot sequence with the primary BIOS is attempted.

Figure 3A:
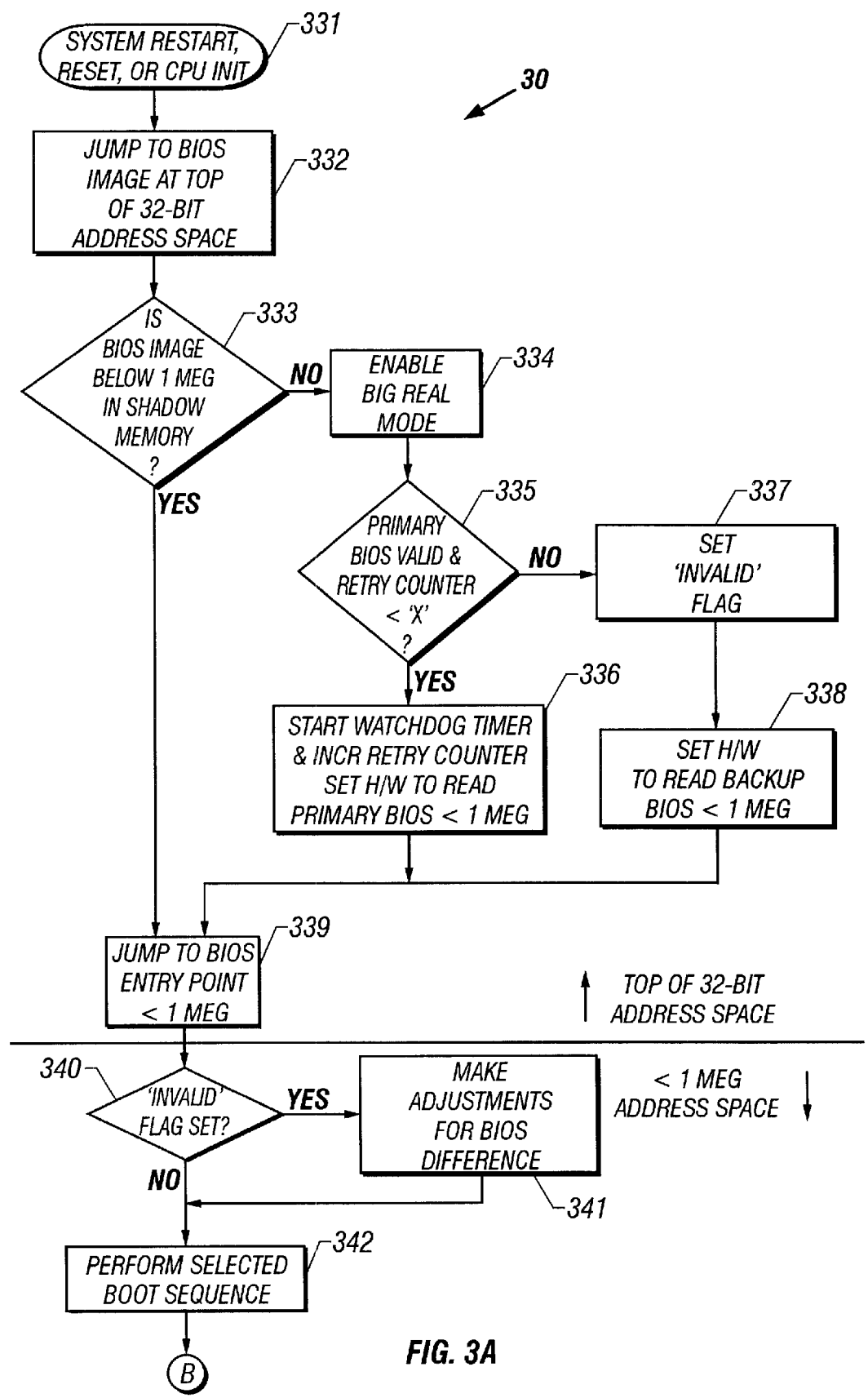

FIGS. 3A–C show a flow chart 30 of an embodiment that distributes the BIOS code between high and low memory. Many processors are designed to automatically jump to a location at the top of addressable memory space whenever the system is reset. In the embodiment shown in FIG. 3A, the determination of which BIOS image to execute is made in blocks 331–339 while still in upper memory, but most of the primary and secondary BIOS code is located in the lower one megabyte of addressable memory space and execution of the boot sequence is performed in blocks 340–342. In the illustrated embodiment, the primary and backup boot sequences can be considered to be in low memory in the lower 1 megabyte of addressable memory space, while the validation and BIOS-selection code may be considered to be in high memory at the upper end of addressable memory space.

Block 331 represents an action that triggers entry into the BIOS code. In one embodiment, this may be a system restart, a reset, or a CPU initialization signal. The exact address of the entry point may be determined by the design of the processor, regardless of the BIOS code that is being implemented. In block 332, execution may jump from this predetermined address to the BIOS image near the top of the 32-bit address space. In one embodiment, the contents of the BIOS are copied from programmable read-only memory (PROM) into main memory and execution then continues in main memory. This may speed up execution if the PROM memory containing the BIOS image has a slower access speed than main memory. This portion of main memory may be called shadow memory, since its contents now shadow those of the PROM containing the BIOS image. Block 333 may be a decision point to determine if the BIOS image is located in the lower one megabyte of address space in shadow memory. If it is, execution may jump at block 339 to the BIOS entry point in that shadow memory in the lower 1 megabyte. If the BIOS image is not in shadow memory in the lower one megabyte, the code may enable the "big real mode" to allow access to a BIOS image in the upper address range. Big real mode is a well-known operating mode that is hybrid between real mode and protected mode. Real mode, a legacy from the days when computer address space was more limited, only permits one megabyte of address space, while protected mode permits access to the full 4 gigabytes of address space permitted by a 32-bit address. Big real mode has some of the simplicity of real mode, but still allows access to the 4 gigabyte address range. In the embodiment of FIG. 3A, big real mode is enabled at block 334. Then the primary BIOS image is validated. In one embodiment, validation consists of performing a checksum on the code and comparing it to a predetermined checksum for that code. The retry counter may also be checked at block 335 to see if it has reached a predetermined value shown as 'X'. If the primary BIOS code is validated at block 335, indicating the code has passed the validation test, and the retry counter has not reached the predetermined value, block 336 may increment the reset counter and start the watchdog timer and then prepare the hardware to decode the primary BIOS in the lower one megabyte range. Block 339 then jumps to the BIOS entry point in that lower range. In one embodiment, preparing the hardware to decode the primary BIOS includes setting bits in control logic 111 to select the primary BIOS 114 in memory device 112 (see FIG. 1). If the primary BIOS code is not validated at block 335, i.e., if it fails the validation test, indicating the code has been corrupted, or if the retry counter indicates the primary BIOS has been retried a specified number of times, block 337 may set an 'invalid' flag to warn the user that the primary BIOS image is invalid and that the backup image is being used. In one embodiment, this warning may take the form of a message to the user. Block 338 may then prepare the hardware to decode the backup BIOS in the lower one megabyte range and then block 339 jumps to the BIOS entry point in that lower range. In one embodiment, preparing the hardware to decode the backup BIOS includes setting bits in control logic 111 to select the backup BIOS 113 in memory device 112 (FIG. 1).

After jumping to lower memory in block 339, block 340 may determine if the 'invalid' flag has been set. If it has not, the selected boot sequence may then be continued at block 342. If it has been set, block 341 may make any necessary adjustments to accommodate the differences between the primary BIOS and the backup BIOS, such as clearing and rewriting the CMOS settings. In one embodiment, all BIOS-related settings may initially be set for the primary BIOS, and will need to be changed only if a defective primary BIOS image causes a switch to the backup BIOS.

Once the selected boot sequence is started at block 342, it may continue though point 'B' to block 343 in FIG. 3B. If the boot sequence executes properly, it will complete before the watchdog timer times out, and it will clear the retry counter and disarm the watchdog timer at block 344 before passing control to the operating system at block 345. If the boot sequence is expected to take longer than the longest period the watchdog timer can be set to, the boot sequence may be programmed to periodically restart the watchdog timer. Otherwise, the watchdog timer may be set to a single value that allows time for the boot sequence to run to completion. FIG. 3C shows the sequence that occurs if the watchdog timer times out as indicated at block 350. A timeout of the watchdog timer may indicate that execution of the BIOS is not going as planned and that something is wrong with that execution. This may be used to detect some faults in the BIOS that escaped detection in the validation test. A timeout may reselect the backup BIOS at block 351 and return control to the BIOS entry point from block 352 in FIG. 3C to block 331 in FIG. 3A. This may restart the validation and timeout sequences previously described. If the watchdog timer times out, indicating an execution failure of the primary BIOS, the primary BIOS may be retried a predetermined number of times by use of the retry counter which is tested at block 335 and incremented at block 336. When the designated number of retries occurs, the retry counter will reach a value of 'X', which causes execution of the backup BIOS in blocks 339–345. The retry counter may be initialized (not shown) before the first boot sequence with the primary BIOS is attempted.

Figure 4:
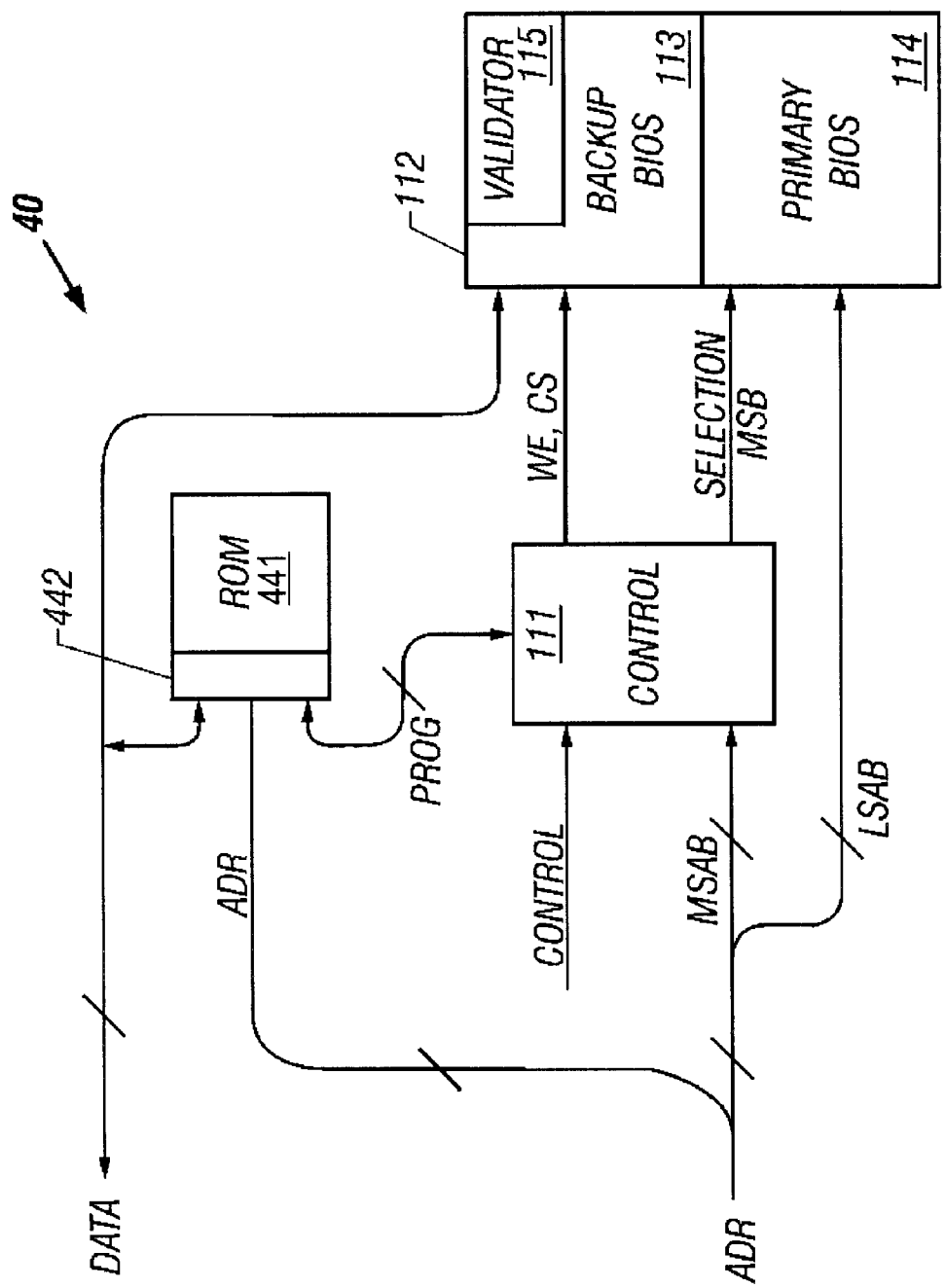
FIG. 4 shows a block diagram of a dual-BIOS system with a module for programming the BIOS contents.

FIG. 4 shows a system 40 that may be much like system 10 in FIG. 1, but with the addition of a module for programming one or both of the primary and secondary BIOS images. Programming device 441 may be used to program the contents of backup BIOS 113, and may also be used to program the contents of primary BIOS 114. In one embodiment, programming device 441 may include a pre-programmed read-only memory (ROM) chip on a module with a connector. Interface 442 may be a mating connector on the same printed circuit board that contains memory device 112 that permits device 441 to be mechanically and electrically attached to or removed from the system. In one embodiment, all of device 441 receives its electrical power, input signals, and mechanical support through interface 442 and/or the circuit board so that no external connections are needed to program memory device 112.

When a system is initially constructed, memory device 112 may be empty, i.e., unprogrammed with a BIOS. Since a BIOS program or its equivalent may be necessary to boot the computer system, inserting device 441 into interface 442 may provide the equivalent of a BIOS program and also permit memory device 112 to be programmed with a BIOS for future boot operations. Once memory device 112 has been programmed, device 441 may be removed. Interface 442 may provide data (DATA) and address (ADR) lines to device 441 from a system bus so that the contents of the ROM may be read by the system processor over a standard bus. Connector 442 may also provide handshaking signals on lines PROG to enable control logic 111 to switch to device 441. In one embodiment, interface 442 may provide a module presence detect line to control logic 111 to provide an indication to control logic 111 when device 441 is plugged into interface 442. Upon receiving this indication that the ROM is plugged in, control logic 111 may block access to memory device 112 by deasserting the chip enable signal to memory device 112, and may provide access to device 441 by asserting a chip enable signal to device 441. When a reset, system restart, or CPU initialization signal causes execution to jump to high memory as previously described, this action may enable the ROM to provide instructions to the system processor in response. The ROM may contain the equivalent of initial BIOS code that permits the system processor to gain control over basic system resources. The ROM may also contain code that permits control logic 111 to again allow access to memory device 112. With this ability, a BIOS program may be copied from the ROM into memory device 112. The ROM may also contain code to validate the contents of memory device 112 by verifying that the BIOS copied correctly.

For either initial BIOS programming or for revising backup BIOS 113, inserting device 441 may permit backup BIOS 113 to be programmed into memory device 112. In one embodiment, primary BIOS 114 may also be programmed from device 441. In another embodiment, once backup BIOS 113 has been programmed, primary BIOS 114 may be downloaded into memory device 112 by the system during system operation. In either embodiment, primary BIOS 114 may be revised by downloading the revised primary BIOS into memory device 112 by the system during system operation. These features may permit primary BIOS 114 to be upgraded during system operations without the need for special equipment or technical support, and may also permit primary BIOS 114 to be upgraded without an operator present through the use of a remote download. At the same time, backup BIOS 113 may be protected from inadvertent corruption by requiring the insertion of device 441 before backup BIOS 113 may be reprogrammed.

The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method comprising:
   connecting a programming module onto a circuit board containing a memory device;
   booting a computer system by reading contents from the programming module;
   copying a backup BIOS program from the programming module to the memory device;
   copying a primary BIOS into the memory device;
   removing the programming module from the circuit board; and
   subsequently booting the computer system from the memory device by:
      validating the primary BIOS;
      automatically selecting for execution a first boot sequence in the primary BIOS if the primary BIOS is determined to be valid; and
      automatically selecting for execution a second boot sequence in a backup BIOS if the primary BIOS is determined to be not valid.

2. The method of claim 1,
   wherein copying a primary BIOS into the memory device comprises copying a primary BIOS into the memory device without using the programming module.

3. The method of claim 1, wherein:
   connecting the programming module includes receiving all necessary electrical power for the programming module from the circuit board.

4. The method of claim 1, wherein:
   connecting the programming module includes receiving all necessary mechanical support for the programming module from the circuit board.

5. An apparatus, comprising:
   a memory device including a primary BIOS and a backup BIOS;
   a validator to validate at least a part of the primary BIOS;
   control logic coupled to the memory device to automatically select a first boot sequence in the primary BIOS for execution if the primary BIOS is validated and to automatically select a second boot sequence in the backup BIOS for execution if the primary BIOS is not validated; and
   a timer to determine whether the primary BIOS executes within a predetermined period of time.

6. The apparatus of claim 5, wherein:
   the validator includes code in the backup BIOS to perform a validation process on the first boot sequence.

7. The apparatus of claim 5, wherein:
   the backup BIOS is write-protected.

8. The apparatus of claim 5, wherein:
   the backup BIOS is write-protected except during a programming operation on the backup BIOS.

9. The apparatus of claim 5, wherein:
   the memory device is a single integrated circuit.

10. The apparatus of claim 5, further comprising:
    a programming device to program the backup BIOS.

11. The apparatus of claim 10, wherein:
    the programming device includes a read-only memory.

12. The apparatus of claim 10, wherein:
    the programming device is removably connected to a circuit board containing the memory device.

13. The apparatus of claim 12, wherein:
    the programming device is connected to receive all its electrical power from the circuit board.

14. The apparatus of claim 12, wherein:
    the programming device is connected to receive all its mechanical support from the circuit board.

15. The method of claim 1, wherein copying a primary BIOS program into the memory device comprises copying a primary BIOS program from the programming module to the memory device.

16. The method of claim 1, further comprising reprogramming the backup BIOS program from the programming module.

17. The method of claim 1, further comprising updating the primary BIOS in the memory device during system operation without using the programming module.

* * * * *